United States Patent
P et al.

(10) Patent No.: US 11,157,471 B2
(45) Date of Patent: Oct. 26, 2021

(54) GENERIC AUTONOMOUS DATABASE TUNING AS A SERVICE FOR MANAGING BACKING SERVICES IN CLOUD

(71) Applicant: SAP SE, Walldorf (DE)

(72) Inventors: Meenakshi Sundaram P, Walldorf (DE); Mayank Tiwary, Rourkela (IN); Pritish Mishra, Bangalore (IN); Shashank Mohan Jain, Karnataka (IN)

(73) Assignee: SAP SE, Walldorf (DE)

( * ) Notice: Subject to any disclaimer, the term of this patent is extended or adjusted under 35 U.S.C. 154(b) by 244 days.

(21) Appl. No.: 16/351,737

(22) Filed: Mar. 13, 2019

(65) Prior Publication Data
US 2020/0293503 A1    Sep. 17, 2020

(51) Int. Cl.
| | | |
|---|---|---|
| G06F 16/20 | (2019.01) | |
| G06F 16/21 | (2019.01) | |
| G06N 5/04 | (2006.01) | |
| G06F 17/18 | (2006.01) | |
| G06F 11/34 | (2006.01) | |
| G06F 16/25 | (2019.01) | |

(52) U.S. Cl.
CPC ........ *G06F 16/217* (2019.01); *G06F 11/3409* (2013.01); *G06F 16/252* (2019.01); *G06F 17/18* (2013.01); *G06N 5/04* (2013.01)

(58) Field of Classification Search
CPC .. G06F 16/217; G06F 16/252; G06F 11/3409; G06N 5/04
See application file for complete search history.

(56) References Cited

U.S. PATENT DOCUMENTS

| 9,779,117 | B1* | 10/2017 | Guo | H04L 67/10 |
|---|---|---|---|---|
| 2005/0203940 | A1* | 9/2005 | Farrar | G06F 16/2228 |
| 2010/0257151 | A1* | 10/2010 | Lohman | G06F 16/2228 |
| | | | | 707/715 |
| 2012/0101984 | A1* | 4/2012 | Lintum | G06F 16/217 |
| | | | | 707/609 |
| 2015/0019197 | A1* | 1/2015 | Higginson | G06F 16/214 |
| | | | | 703/22 |
| 2015/0019707 | A1* | 1/2015 | Nathan | G06F 11/3428 |
| | | | | 709/224 |
| 2016/0140177 | A1* | 5/2016 | Chamberlin | G06F 16/2455 |
| | | | | 707/717 |
| 2017/0126795 | A1* | 5/2017 | Kumar | H04L 67/1023 |
| 2020/0125545 | A1* | 4/2020 | Idicula | G06N 20/20 |

\* cited by examiner

*Primary Examiner* — Tarek Chbouki
(74) *Attorney, Agent, or Firm* — Buckley, Maschoff & Talwalkar LLC

(57) ABSTRACT

A system and method are disclosed to facilitate a database tuning as a service offered by a cloud platform as a service provider. A throttling detection engine, associated with a database service instance, may periodically determine if an automated database tuning process should be performed. When it is determined that the automated database tuning process should be performed, the throttling detection engine may transmit database performance metrics. A database tuner as a service, coupled to the throttling detection engine, may access aggregated database performance metrics of the database service instance and determine a set of tunable parameters associated with the database service instance. The database tuner as a service may then execute the automated database tuning process to recommend, using an intelligent algorithm, a new set of configurations for the set of tunable parameters to be applied to the database service instance.

20 Claims, 15 Drawing Sheets

GENERIC AUTONOMOUS DATABASE TUNING AS A SERVICE FOR MANAGING BACKING SERVICES IN CLOUD

BACKGROUND

An enterprise, such as a service provider, may use a cloud computing offering to run applications and/or to provide services. For example, a Platform-As-A-Service offering might process purchase orders, perform human resources functions, etc. In some cases, the service being provided is associated with a DataBase Management System ("DBMS"). Moreover, a DBMS may have hundreds of configuration "knobs" that control operation of the system, such as: an amount of memory to use for caches, how often data is written to storage, how often the logs are written to disk, a maximum size of log files, a maximum number of parallel connections permitted, a number of dirty buffers to be written by the background writer, etc. Properly tuning DBMS configuration knobs based on the application's workload and the hardware ability can substantially influence the performance of the system.

Properly tuning database control knobs, however, can be a time consuming and complicated task. For example, the enterprise might apply a substantial human effort to analyze all possible configurations to suggest an optimum set of knob setters (e.g., based on a combination of experience, estimation, and trial/error). It can be virtually impossible to tune a DBMS for multiple types of workloads, so an "average" configuration may be chosen that functions across various workloads giving a decent level performance. Moreover, in some cases, knob configurations may be dependent on one-another further complicating the tuning process.

It would therefore be desirable to provide automated database tuning as a service to manage platform data services in a fast, automatic, and accurate manner.

SUMMARY

According to some embodiments, methods and systems may facilitate a database tuning as a service offered by a cloud platform as a service provider. A throttling detection engine, associated with a database service instance, may periodically determine if an automated database tuning process should be performed. When it is determined that the automated database tuning process should be performed, the throttling detection engine may transmit database performance metrics. A database tuner as a service, coupled to the throttling detection engine, may access aggregated database performance metrics of the database service instance and determine a set of tunable parameters associated with the database service instance. The database tuner as a service may then execute the automated database tuning process to recommend, using an intelligent algorithm, a new set of configurations for the set of tunable parameters to be applied to the database service instance.

Some embodiments comprise: means for periodically determining, by a throttling detection engine associated with a database service instance, if an automated database tuning process should be performed; when it is determined that the automated database tuning process should be performed, means for transmitting database performance metrics; means for accessing, by a database tuner as a service coupled to the throttling detection engine, aggregated database performance metrics of the database service instance; means for determining a set of tunable parameters associated with the database service instance; and means for executing the automated database tuning process to recommend, using an intelligent algorithm, a new set of configurations for the set of tunable parameters to be applied to the database service instance.

Some technical advantages of some embodiments disclosed herein are improved systems and methods to provide automated database tuning as a service to manage platform data services in a fast, automatic, and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
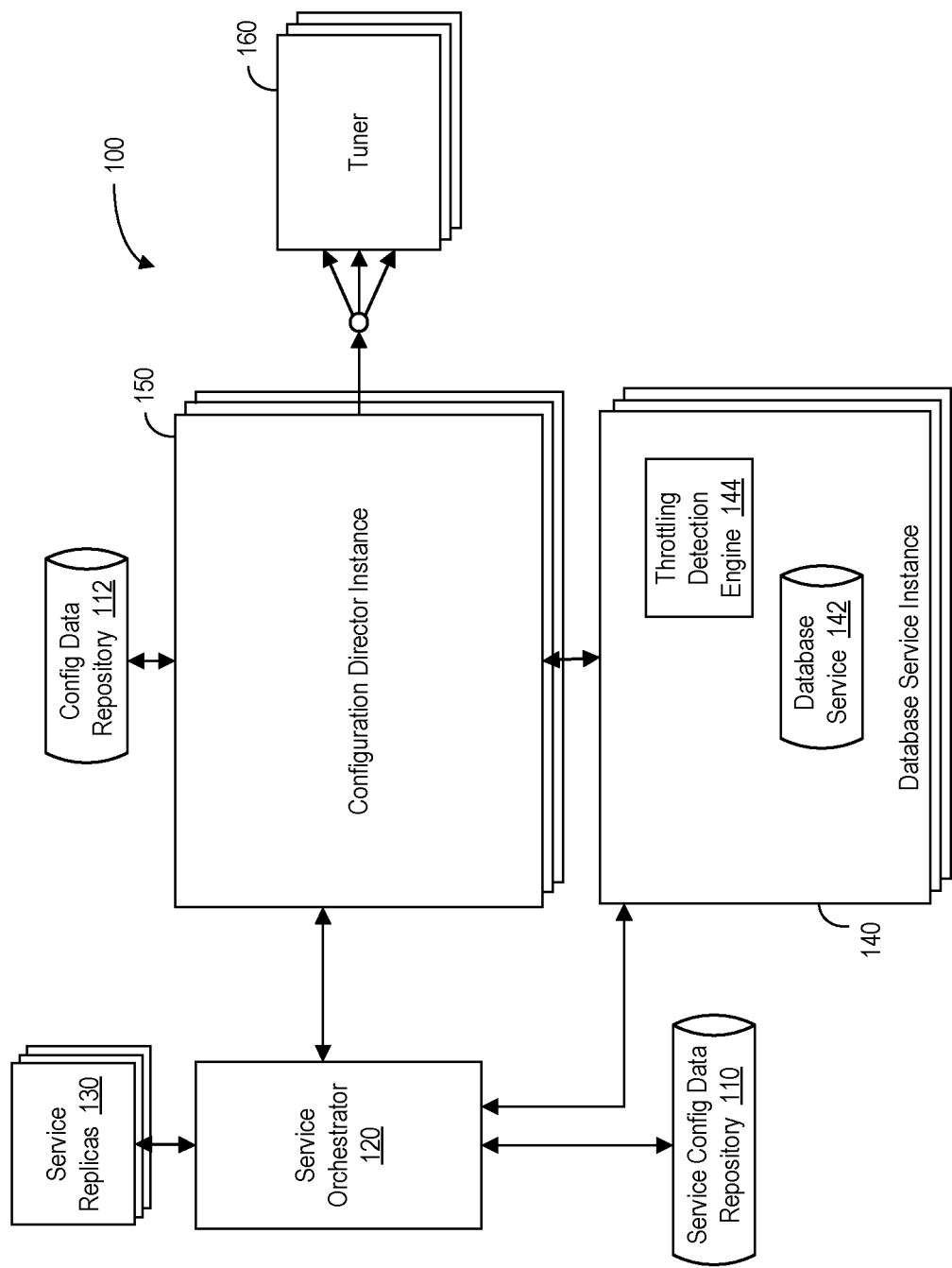
FIG. 1 is a high-level block diagram of a database tuning as a service system in accordance with some embodiments.

FIG. 1 is a high-level block diagram of a system 100 associated with a database tuning as a service framework in accordance with some embodiments. The system 100 includes a service configuration ("config") data repository 110 and a service orchestrator 120 that is coupled to database service instances 140 and configuration director instances 150. Database services 142 and a throttling detection engine 144 may result in the configuration director instance 150 requesting that an automated tuner 160 evaluate control knobs. As used herein, the term "automated" may refer to, for example, actions that can be performed with little or no human intervention. Results from the tuner 160 may be tested (e.g., via service replicas 130) and a configuration data repository 112 may be updated as appropriate by an Infrastructure-as-a-Service ("IaaS") provider. As used herein, the term IaaS may refer to any shared pools of configurable computer system resources and higher-level services that can be rapidly provisioned with minimal management effort (e.g., via the Internet). According to some embodiments, an IaaS provider may be associated with an IaaS data center that provides high-level Application Programming Interfaces ("APIs") to de-reference various low-level details of an underlying network infrastructure like physical computing resources, location, data partitioning, scaling, security, backup, etc. According to other embodiments, an IaaS provider can be used along with a Platform-as-a-Service ("PaaS") offering that provides a platform allowing user to develop, run, and manage applications without the complexity of building and maintaining the infrastructure typically associated with developing and launching applications.

According to some embodiments, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 100 may store information into and/or retrieve information from various data stores (e.g., the database services 142, service config data repository 110, and config data repository 112), which may be locally stored or reside remote from the database service instances 140 and/or configuration director instances 150. Although a single service orchestrator 120 is shown in FIG. 1, any number of such devices may be included. Moreover, various devices described herein might be combined according to embodiments of the present invention. For example, in some embodiments, the service orchestrator 120 and service config data repository 110 might comprise a single apparatus. The system 100 functions may be performed by a constellation of networked apparatuses, such as in a distributed processing or cloud-based architecture.

A user (e.g., a database administrator) may access the system 100 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to direct or initiate a tuning process) and/or provide or receive automatically generated recommendations or results from the system 100.

Figure 2:
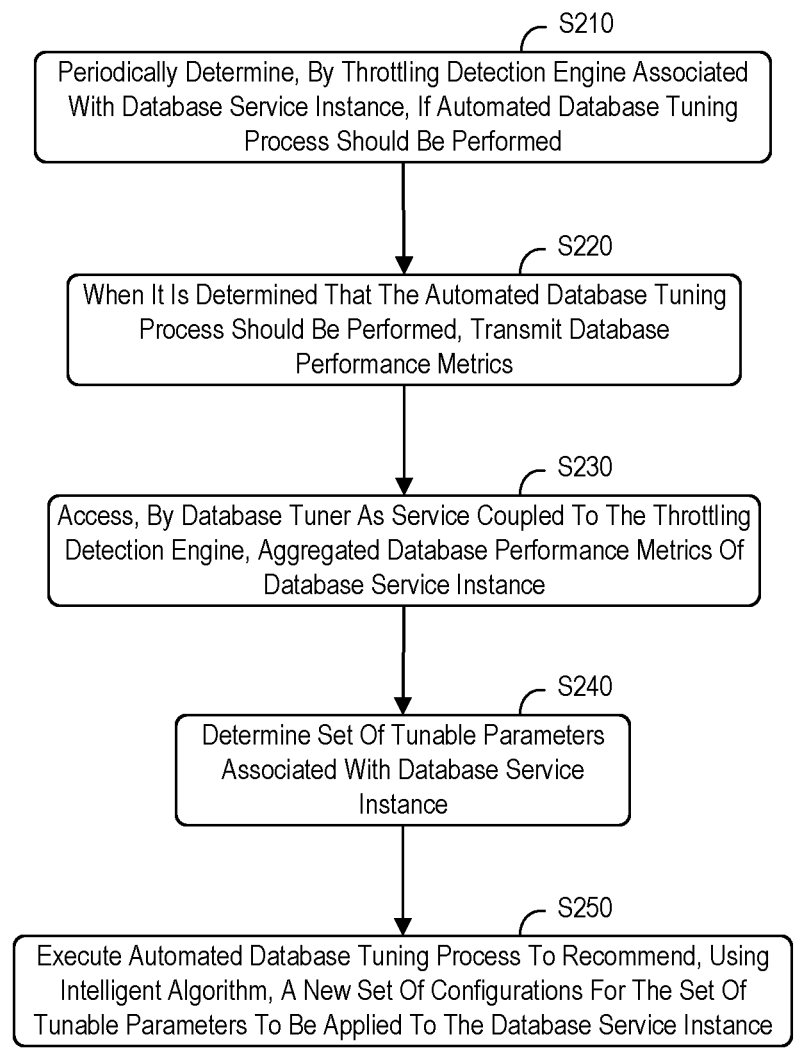
FIG. 2 illustrates a database tuning as a service method according to some embodiments.

FIG. 2 illustrates a database tuning as a service method according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S210, a throttling detection engine associated with a database service instance may periodically determine if an automated database tuning process should be performed. When it is determined that the automated database tuning process should be performed, database performance metrics may be transmitted at S220. At S230, a database tuner as a service coupled to the throttling detection engine may access aggregated database performance metrics of the database service instance. At S240, the system may determine a set of tunable parameters associated with the database service instance. At S250, the automated database tuning process may be executed to recommend, using an intelligent algorithm, a new set of configurations for the set of tunable parameters to be applied to the database service instance.

Figure 3:
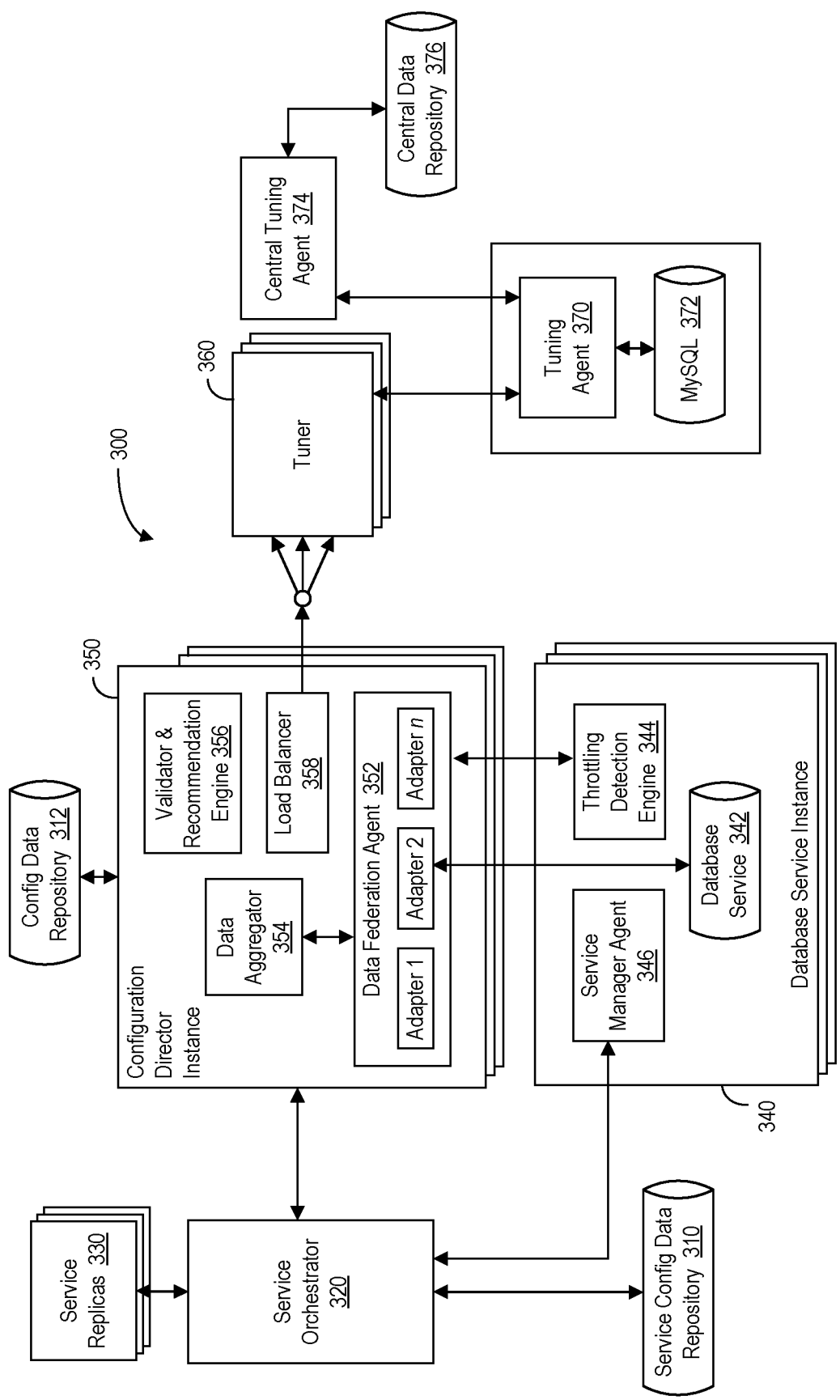
FIG. 3 is a more detailed block diagram of a database tuning as a service system in accordance with some embodiments.

FIG. 3 is a more detailed block diagram of a database tuning as a service system 300 in accordance with some embodiments. As before, the system 300 includes a service configuration ("config") data repository 310 and a service orchestrator 320 that is coupled to database service instances 340 (via a service manager agent 346) and configuration director instances 350. Database services 342 and a throttling detection engine 344 may result in the configuration director instance 350 requesting that an automated tuner 360 evaluate control knobs. As used herein, the term "automated" may refer to, for example, actions that can be performed with little or no human intervention. Results from the tuner 360 may be tested (e.g., via service replicas 330) and a configuration data repository 312 may be updated as appropriate by an IaaS provider.

As illustrated in FIG. 3, the configuration director instances 350 may include a data federation agent 352 (with multiple adapters able to exchange information with various types of databases), a data aggregator 354, and a validator and recommendation engine 356. A load balancer 358 may interact with the tuner 360. The tuner 360 may utilize a tuning agent 370 (coupled to MySQL 372) and a central turning agent 374 (coupled to a central data repository 376).

Thus, some embodiments described herein may help overcome potential challenges while deploying automated tuning of database tuning as a service for a PaaS solution provider. Some of those challenges might include (i) automated detection of performance throttling of a database and identify potential points where a database requires a tuning, (ii) scalability of tuning service (i.e., how a single tuning service deployment can be mapped with maximum number of database services offered by a service provider), and (iii) applying and validating the recommendations obtained from tuning services (including applying an obtained recommendation that requires a database restart). Some embodiments utilize a generic tuning service architecture as illustrated by the system 300 of FIG. 3 for PaaS providers. The throttling detection engine 344 may detect potential points where performance indicates that a database may need tuning. This may also reduce the number of recommendation requests made to a database tuning service (increasing the scalability of the service). According to some embodiments, tuning recommendations may be efficiently applied without causing much disruption in the Quality of Service ("QoS") of the underlying database system.

Note that PaaS offerings may have a wide range of data services for customers, including relational databases, NoSQL databases, in-memory databases, messaging services, enterprise service buses, etc. However, customers might not have the access to tune the configuration knobs of services (e.g., when the service configurations are abstracted). Tuning of the offered data services often requires a DataBase Administrator ("DBA") observe/monitor the system and then tune the service-instances. This often adds more complexity, as PaaS providers needs to have a DBA for each customer (and each service offered might have ten to hundreds of knobs that need to be tuned). In some cases, an auto-tuners may automate some of the DBA tasks, but these tools are not generally holistic in nature and are limited to specific classes of parameters.

Embodiments described herein may introduce a generic Autonomous DataBase Tuner as a Service ("AutoDBTaaS") which can tune configuration knobs for data services as required (reducing the performance dependency on a DBA). Potentially, the challenges that drive the design and deployment of a tuning service as per PaaS architecture may include a generic tuning architecture, the scalability of an AutoDBTaaS, appropriate observation/monitoring times, and validating and applying recommendations With respect to a generic tuning architecture, the system 300 should be able to tune different data services. For example, the service should be able to tune PostgreSQL, MySQL, MongoDB, etc. A generic tuner may use large scale machine learning for optimal tuning of knobs and may be easily adopted to a set of databases. Such a generic tuner's architecture can then be built upon to target tuning of modern database systems like PostgreSQL, MySQL, etc. While the underlying database system may periodically trigger recommendation requests, the tuning process may collect metrics and knobs from a target system and then use large-scale machine learning to predict a new set of configurations to be applied to target systems, (which will lead to optimal performance in terms of query throughput).

With respect to the scalability of an AutoDBTaaS, the architecture of a generic tuner, may use previously observed workloads to train a generic regression process or model, such as a Gaussian Process ("GP") Regression ("GPR") model, to recommend a new set of configs. The workload in a generic tuner is a collection of different knob values, obtained with respect to observed database metrics. The training of GPR model further depends upon the size of the workload. To obtain the optimal workload data, the size of the workload needs to be sufficiently high. The workload should contain enough data, where sufficient metric variations are observed across different variations in values of knobs. Usually, the best way to generate such a workload is by sweeping relevant knobs with respect to the nature of input workload. In this process, the generic tuner's workload size increases and might cause GPR training to take from 100 to 120 seconds. Then, if the underlying services asks for recommendation with a relatively high frequency (e.g., every 5 minutes), one generic tuner deployment can be bound to a maximum of 3 to 4 service instances. This can also be inferred as a cost for generic tuner style tuners—a "recommendation-cost" to a service-provider. In order to increase the binding number (or minimize the recommendation costs) and scalability of a generic tuner deployment on PaaS, the underlying services should trigger requests for recommendation only when required (instead of periodically triggering recommendation requests). Now, as the number of requests triggered from underlying services is reduce, the system may accommodate even more services to be bound to a single generic tuner deployment.

With respect to appropriate observation/Monitoring times, the workload should store metrics which have enough variations across knob values. The variations are captured only when the users are executing very high SQL workload on the database. However, in production systems, the throughout is often low, which might not produce enough variations in the workload. In production systems, the spikes in a throughput graph is seen only at specific time-intervals. In many cases, it is observed that even if there is high throughput, only a certain set of metrics show good variations while the rest do not. The other parameters which show high correlation with the variations of metrics might be associated with checkpoint-related knobs. If the checkpoints are triggered frequently, then the checkpoint-related metrics will show high variations. The observation/monitoring time might therefore be a function of these relevant knobs. The observation time may also depend upon constants (e.g., a memory pre-warming duration).

With respect to validation and applying recommendations, after the correct metrics are observed and sent to GPR model, the GPR model may generate a new configs as output. The maximum and minimum values that the GPR model uses for recommendation might be based on the maximum and minimum values that the GPR has already observed during previous workloads. If the GPR has not seen may values for a specific knob, it might randomly generate values for unknown regions. Because non-linear dependencies exist across different knobs (which may make it difficult to build a rule-based engine to validate the recommendations generated from tuner), another problem may be encountered when applying the obtained recommendations (particularly if the knobs require a restart of the database to take effect). Restarting the database will lead to downtime on live systems, which is usually not desirable. Additionally, most of the database service offerings have High Availability ("HA") logic, and doing a config change often requires the system to update all corresponding nodes in a deployment cluster.

Some embodiments described herein identify actual performance throttling on a database system. With respect to a changing workload pattern of users SQL work-load, performance throttling may also help predict incorrect knobs. Note that performance throttling may be responsible for identifying the database insufficiency to process SQL queries due to incorrectness of configured knobs. It may classify knobs into different classes and then, for each class of knobs, predict throttling. This module increases the scalability of the tuner deployment by reducing the number of recommendation requests. The underlying services request for recommendation only when a performance throttling is detected. Thus, this module acts as a DBA and identifies when a database requires an actual tuning.

Embodiments may also define a function that takes values of some important knobs and suggests the observation time for monitoring. With dynamically changing configurations of databases, the observation time also becomes dynamic in nature. The metric collector module collects metrics and performs metric aggregations based on the signals triggered by the performance throttling module. Thus, the metric collector may be responsible for triggering recommendation requests.

A recommendation validator may, according to some embodiments, receive recommendations from the tuner, validate the recommendations using safety nets, test the recommendations on bare service-instances, and then apply the recommendation on service-instance by reloading the configs. The recommendation validator may also be responsible for tuning knobs that require a restart of the database. The recommendation validator may also handle writing new knobs to the persistence layer (which may be important to maintain the HA logic of the respective service-instance).

Deploying database tuning services on cloud platforms, such as Cloud-Foundry, may involve many challenges such as maintaining high availability of services, zero down-time, minimization of dev-ops, disaster recovery, zero data-loss, etc. The generic architecture 300 described herein can be easily integrated with any available set of cloud platform provisioners. As shown in FIG. 3, the overall deployment of a database tuning service, in an abstract form, may be divided into two parts: (i) tuner instances to execute the machine learning pipeline to give new config recommendations, and (ii) config director instances to manage all available customer service-instances. The tuner instances can be spawned via a Virtual Machine ("VM") ware, multi-tenant container, and there can be more than one tuner instance. Each tuner stores a workload W in a database, where a workload is combination of knob config parameters and metrics observed against those parameters. A workload W may comprise a set S of N matrices S: $\{X_0, X_1, X_2, \ldots, X_{N-1}\}$ having identical rows and columns, where $X_{m,i,j}$ is the value of a metric m observed when executing a user SQL workload on database having configuration, j and the workload identifier, i. The tuner service 360 uses the workload W for training the GPR model. The workloads are stored in database which is present on a different instance. The database acts as a common central data repository for all tuner instances. The tuning agent 370 runs on the same database which is responsible for identifying new workloads and uploads new workloads data periodically to the central data repository 376. The PaaS offerings often runs on multiple infrastructures such as AWS, Azure, Open-stack, etc. The tuning services 360 running on different IaaS instances fetch the new workloads from the central data repository 476. This helps all tuning services 360 get the new unknown workloads, which might have been observed on a different IaaS, and create a better machine learning model. The tuning agent 370 running on the tuner database instance also triggers certain periodic machine learning tasks such as data pruning (e.g., via any dimensionality reduction technique) and ranking of knobs (e.g., via any regression algorithm). Based on runtime, on-demand tasks may need to be performed by tuner instances 360.

The config director instances 350 reads the metrics from customer database service instances 340 by making JDBC calls to the database process running on these instances. The metric readings and recommendation request calls are event-based and triggered from the performance throttling detection engine 344. The throttling detection engine 344 periodically executes the proposed performance throttling algorithm and triggers recommendation requests to the config director. The throttling detection engine 344 runs periodically on the master virtual of the underlying database service and is responsible for figuring out performance throttling due to incorrect knob values with respect to current executing user workload. The config director receives the metric data from service instances and triggers requests to tuner instances 360 to get recommendation. The config director performs load balancing 358 of recommendation request tasks across multiple tuner instances 360. The service orchestrator 320 agent running on database services may perform maintenance tasks such as backup, restore, and update. When the config director receives the new recommendation for a database service instance from a tuner 360, it performs validation 356 of the recommendations by leveraging the safety-net rule-base. Often, the rule-based logic is service specific and needs to be re-written for different kinds of services that are offered. There are often cases where the con fig knobs are non-linearly dependent on each other, which makes rule-based solutions inefficient. Hence, once the rule-based engine validates the recommendations, these are tested on bare service-replica instances 330. These service instances 330 are set of instances having different plans (example—m4.xlarge, t2.medium, etc.) with no data and are used only for final validation of recommendations. After the validations of recommendation, the config director passes the new configs synchronously to the data federation agent 352 and the service orchestrator 320, while simultaneously storing it into the config data repository 312. The data federation agent 352 fetches the credentials from service orchestrator layer and hits the APIs of throttling detection engine 344 to apply configs to all nodes of the database service (such as all virtual machine and containers of the service-instance). The data federation agent 352 has multiple adapter implementations to get connected to various kinds of database services. The service orchestrator 320 layer is responsible for creating database service instances in real time and for maintaining all the credentials. The service orchestrator 320 acts like a broker layer and registers newly created database services to config director instances 350.

One goal of a database tuning service may be to reduce dependencies on a DBA for physical/knob tuning. One of the initial steps that a DBA performs before tuning is monitoring the database to identify whether or not the database actually needs tuning. A performance throttling module may be responsible for this exact operation. This module executes periodically as a part of throttling detection engine 344, gathers statistics based on the metrics/features collected using a rule-based approach and identifies potential points when a database needs a recommendation for tuning its configs. This may be even more important when the user's SQL workload pattern changes dynamically (and thus requires tuning to be dynamic). Based on the proposed performance throttling approach, config knobs might be categorized (based on their properties) into three classes: memory knobs; background writer knobs; and asynchronous/planner estimate knobs. The performance throttling engine may then run specific scripts for each class of knobs and trigger a recommendation request when any class seem to be experiencing a throttle.

According to some embodiments, the throttling detection engine 344 detects throttles sends the metrics observed during this period to tuning service. The throttling detection engine 344 may also evaluate an appropriate observation time with respect to the executing live workload. For write-oriented workloads, collecting and observing the checkpoint-related metrics may be highly significant. Hence, for write-oriented workloads, the observation time should at-least capture a single event of triggered checkpoint. However, for read-oriented workloads, checkpoint related metrics are less relevant. When a live database instance starts sending metric data to a tuner 360, it may need to show enough variations initially with respect to changing values of knobs to make the current workload mappable to an optimal workload with minimum errors.

Figure 4:
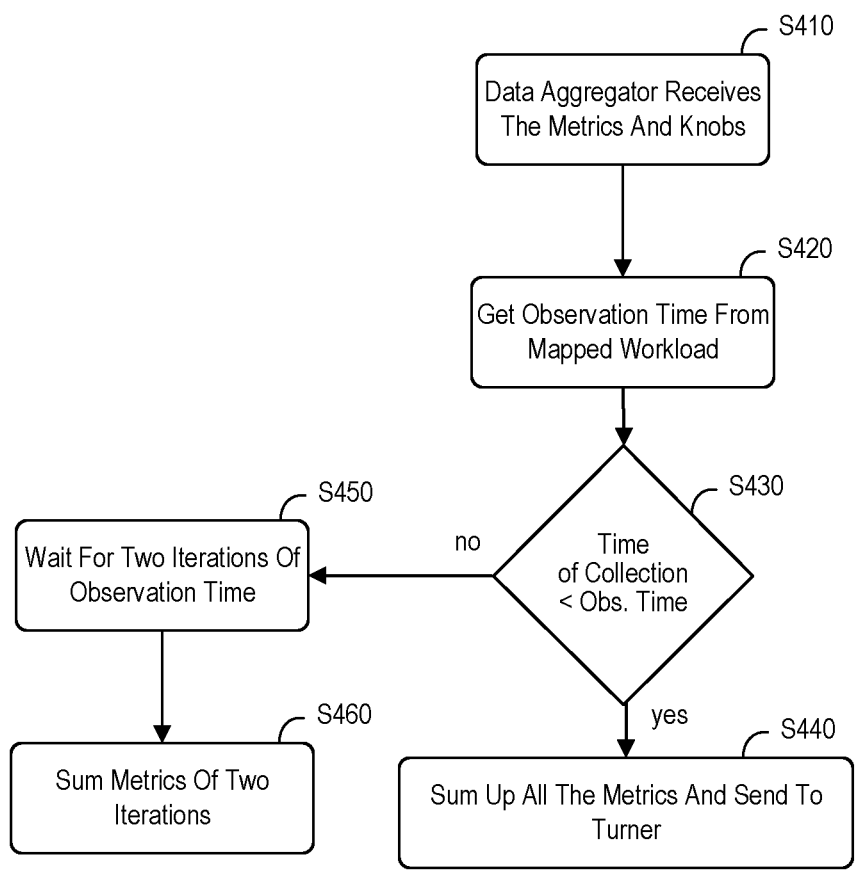
FIG. 4 is a metric collector method according to some embodiments.

FIG. 4 is a metric collector method according to some embodiments. At S410, a data aggregator may receive metrics and knobs. An observation time from a mapped workload may then be obtained at S420. If the time of collection is less than the observation time at S430, all of the metrics may be summed and sent to the tuner at S440. If the time of collection is not less than the observation time at S430, the system waits for two iterations of the observation time at S450 and then sums the metrics of the two iterations at S460. Note that if the metrics collected is more than one observation time but less than two observation times, the data aggregator may aggregate all of the metrics and send them to the tuner. Thus, when the workload starts, the observation time is configured to be of the same value as that of the workload to which the current workload is mapped. The throttling detection engine 344 running on the database instance captures the metrics at the frequency of a minute and performs a throttling check. If for any metric/feature set a throttle is encountered, the throttling detection engine 344 sends this set to data aggregator 354 running on the config director 350. The config director 350 is aware of the mapping information and checks for the observation time. If the total metric collected is less than the observation time (e.g., the observation time is 5 minutes, and only 2 throttles have been triggered per minute each), then the data aggregator 354 sums up all the metrics obtained during the observation time and sends them to the tuner 360. In the counter-part, if the total metric collected is more than the observation time, the data aggregator 354 waits for at least 2 iterations of observation time, performs aggregation and sends the data to the tuner 360. In boundary conditions, if the metrics collected is more than one observation time but less than twice the observation time, the data aggregator 354 aggregates all received metrics and sends them to the tuner 360. However, if more than 2 iterations of observation-time have elapsed, then the data aggregator 354 captures a new set of metrics and sends it to the tuner 360. Before starting the collection of metrics, the pre-requisite may be that the data is already loaded into the buffer or pre-warming. Otherwise, the throttling detection engine 344 might not collect the metrics (and instead waits until pre-warming is complete).

After the task of obtaining recommendations for the system 300, validating these recommendations before applying them to the running database may be the next challenge. An aim of the recommendation process may be to improve database performance. Since the recommendation is based on probabilities, an increase in performance of the system is not be guaranteed with each iteration of recommendation. However, the system can guarantee that whatever recommendation is being applied to a database system will not bring it down or cause any disruption to running tasks. In a HA environment it may be important to ensure that zero downtime is maintained for a database (even after applying the recommended config parameters).

Figure 5:
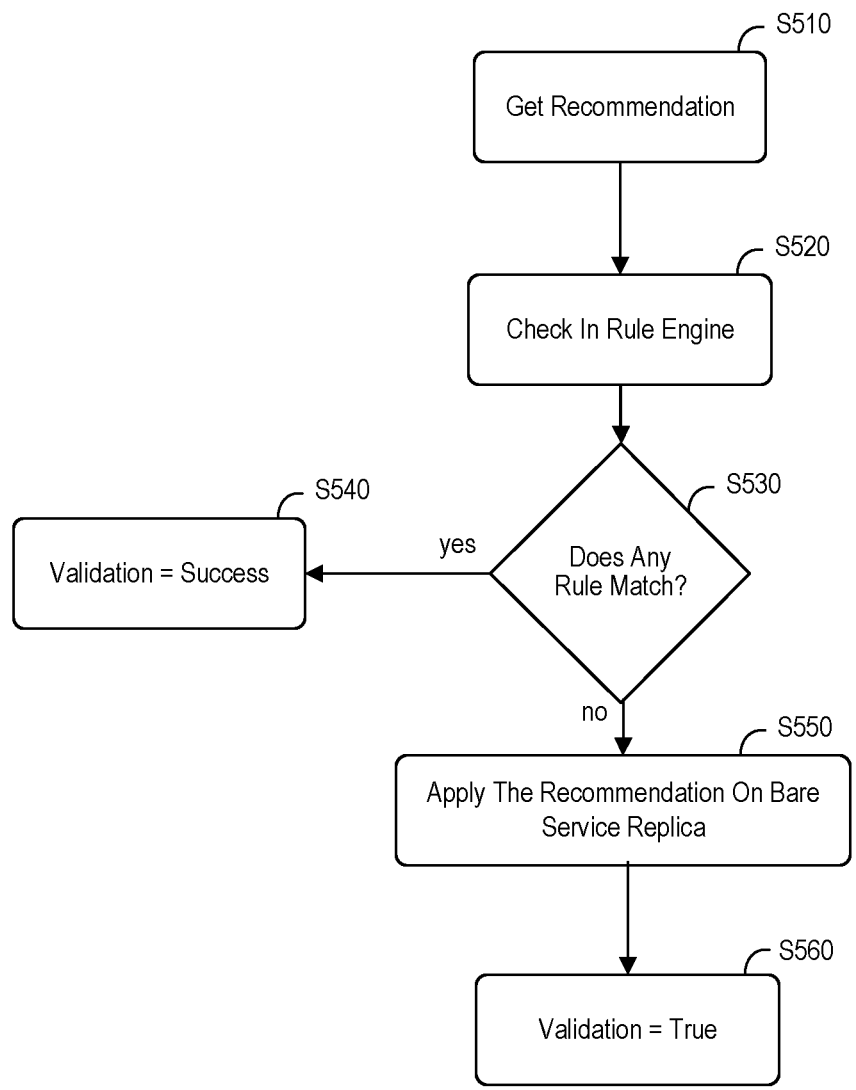
FIG. 5 is a recommendation validation method in accordance with some embodiments.

FIG. 5 is a recommendation validation method in accordance with some embodiments. At S510, the system obtains a recommendation and checks in a rule engine at S520. If the recommendation matches any rule at S530, the validation is set to "success" at S540 and the process is complete. If the recommendation does not match any rule at S530, the system apply the recommendation to a bare service replica at S550. The validation may then be set to "true" at S560.

To validate the recommendations, two layers of filtering may be employed: (1) dynamic rule-based filtering and (2) validation on bare service-replicas. In a dynamic rule-based filtering model, recommendations received from a recommender engine are validated against a pre-defined set of rules. These set of rules have been defined by the validator engine for each individual database service. Initially, while defining these rule-set, the validator has to be made aware of various dependencies that might exist between various configs. This is largely a manual operation and might not result in the most efficient filtering. Thus, it is reasonable to expect that the validation engine starts with a smaller set of rules. However, if a recommendation couldn't be validated against an existing rule, it is validated against the second layer of filtering, as described in the subsequent sub-section. Thus, the rule-set grows dynamically based on experiences gained across landscapes and validation efficiency improves with each such iteration. Examples of a rule in the rule set can be sum of all the memory knobs should always be less that the total memory allocated to the database process from the kernel, the size of WAL storing knob should be in a limit such that during database failure the recovery time should not exceed SLA's.

If the validation of a config is not conclusive in the first layer, an additional layer of filtering is performed by applying the recommended configs on a bare service-replica 330 and observing whether the system incurs downtime or crash failure. A bare service-replica 330 is an instance executing the same database process with the same resource/vm-plan (virtual machine/container) configuration as the production instance. However, it will not contain any data in the database. The purpose of having service-replica 330 is to mimic the behavior of the recommendation on a production instance and prevent any downtime. One service-replica 330 can be used for testing of recommendations for a certain variation of resource configuration. Since, the commercial instances have a fixed set of resource configuration variations (defined by commercial plan offerings), it is expected that the number of service-replicas 330 will be minimum.

Additionally, however, it is reasonable to expect that validation on bare service-replicas 330 will incur more processing time for validation (e.g., it might take from 40 to 80 seconds to restart a database with new configurations) adding more complexity/cost for the process. Thus, it may be more desirable that the validations are completed in the first layer itself and the second layer serves for the purpose of strengthening the initial validation rule set and as a fail-safe, if the initial validation is non-conclusive.

In any generic tuner style tuner, the GPR uses previously seen workloads data to predict an optimal recommendation. In some scenarios this approach causes generation of such recommendations which crashes the underlying system. For example, when training a generic tuner with benchmarks (such as Transaction Processing Performance-C ("TPCC"), Yahoo! Cloud Serving Benchmark ("YCSB"), etc.) it is also aimed at showing generic tuner variation in metrics by sweeping knob values to upper and lower limits. With this, the GPR model figures out that increase in performance is observed by increasing one of the memory knobs. Now the GPR model can start to recommend a high/upper limit for the same knob. The situation worsens when a GPR model observes that there are multiple memory knobs whose values (if increased) results in better performance. After this observation, the GPR model may begin to recommend upper limits for all such knobs which can cause the total sum of the same knob values to exceed the total memory allocated to the database (resulting in a database crash). It is observed that out of total wrong recommendations generated by a generic tuner, the dynamic rule-based filtration (created considering default documentation of database) may catch around 83% of recommendations (and rest are handled by the second layer).

Figure 6A:
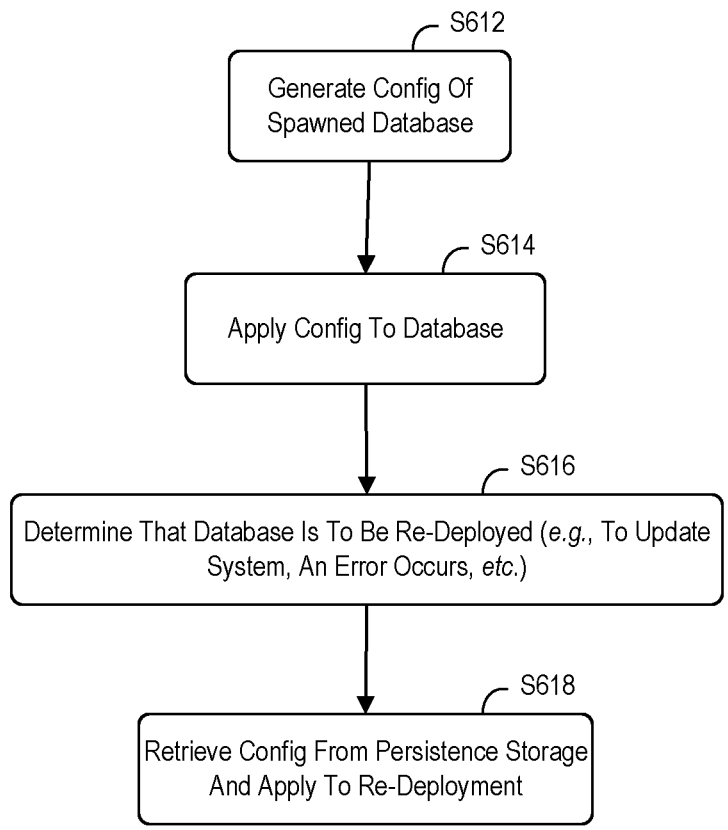
FIG. 6A is a recommendation application method according to some embodiments.

FIG. 6A is a recommendation application method according to some embodiments. At S612, the system may generate a config of a spawned database. At S614 the generated config may be applied to the database. It is determined at S616 that the database is to be re-deployed (e.g., to apply a security patch or when the database crashes). The system may then retrieve the config from persistence storage at S618 and apply it in connection with the re-deployment.

Note that once the recommendations have been validated to be non-intrusive for the system, the final task to be performed is applying these recommendations to the database system. Some potential challenges may include designing the overall orchestration mechanism to apply these configs, considering the prevalent architecture of the database system like multi-node (such as Scaleout, etc.), high-availability constraints, etc. The configs need to be persisted too such that a database reset or re-deployment doesn't overwrite the settings. Additionally, concerns such as how to apply the recommendations without causing database downtime may also need to be addressed.

An orchestration approach may apply the recommendations (taking into consideration the above-mentioned challenges). With the architecture illustrated in FIG. 1, the service-orchestrator may be responsible for spawning database system instances for a customer. The config of the spawned database system is generated and applied initially to the database by the service-orchestrator. If for any reason (like a system update, security patch application, etc.) the database system needs re-deployment, then the service-orchestrator must re-deploy the system with the updated config of the database. Thus, it may be important to maintain a consistent copy of the config to prevent over-writing settings. According to some embodiments, the Data Federation Agent ("DFA") hits API endpoints of TDE to apply the config recommendations. In the case of multiple nodes maintaining high availability, the recommendations may first be applied to the Slave node(s). If the process crashes in the Slave node, the config recommendations are rejected. Thus, it is ensured that the Master node is up and the process is still able to serve requests. After the config recommendations are applied to the Master node, the recommendations may be stored in the persistence storage used by the service-orchestrator. Thus, whenever the service-orchestrator re-deploys the database system in the future, it retrieves the updated config from the persistence storage. An additional concern may be associated with a failure in one of the intermediate steps. Since all of the operations are not atomic, but eventually are expected to yield consistent data (i.e., configs must be same for all master/slave nodes and persistence storage used by service-orchestrator), a Reconciler process watch the config of the database system running on the Master node. If the difference in config is observed for a threshold time-period (watcher timeout), the reconciliation occurs and the config stored in the persistence storage is applied to all nodes. Thus, this will eventually lead to rejection of the config recommendation due to an error in the intermediate process.

Figure 6B:
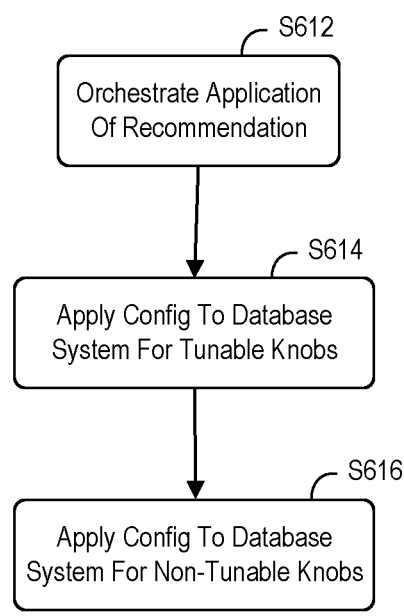
FIG. 6B is a tunable knob application method in accordance with some embodiments.

FIG. 6B is a tunable knob application method in accordance with some embodiments. At S612, the system may orchestrate an application of a recommendation (e.g., as previously described). As will now be described, at S614 the system may apply the config to the database system in connection with "tunable knobs" and in connection with "non-tunable knobs at S616. After the orchestration of applying a recommendation is ensured, the next challenge is to apply the configs to the database system. As usual, it is desired to cause no additional downtime to the database system. One approach may utilize the concept of Socket Activation (kernel feature). In this case, the sockets can be used via a system process which allows the segregation of the socket from the database application. Thus, any restart to the application process could be permissible, since the socket is up and accepting incoming requests that can be queued till the database application completes restart. An advantage of this approach is that the database process can be restarted on-demand. As a result, the knobs that require a database restart can also be tuned. However, even with this approach (although the process is up and accepting requests) the user still faces a lot of jitter and performance degradation during the restart operation. Another major challenge is that many popular database services don't yet support the concept of Socket Activation.

Another approach to solve this challenge is to use Linux process signals to reload the configurations for the database process. Such a technique may result in minimal jitter in the performance of the database.

"Non-tunable knobs" may refer to knobs that cannot be applied/tuned without causing a restart of the database process. Since the restart of database can only be performed during scheduled downtime window (a pre-announced time period where a re-deployment of database occurs), an approach may be defined to tune such knobs. Non-tunable knobs are majorly identified to be memory-related knobs. Thus, the design of the approach can be considered for memory-related knobs. For a non-tunable memory related knob, such as buffer-pool size or buffer-cache size, the optimum value of this parameter can be obtained from the working set. Once this optimum value is determined, the database system may be initially set up with the same value. However, there could be other memory-related knobs that are dependent on such a non-tunable knob. The value of all such knobs must be within the total memory allocated to the database process. Visualizing the scenario with an example, let us consider the following equation. A+B+C+D<X. Here, A could be assumed to be a non-tunable knob like buffer_cache_size. B, C, D could be other tunable memory knobs like work_mem, maintenance work_mem and temp_buffers.

Assuming that X represents the total memory allocated to the database process, the equation becomes: buffer_cache_size+work_mem 30 maintenance work_mem+temp_buffers<tota_mem. However, there is always an upper limit on this knob out of the total memory pool. This knob is changed only during the scheduled downtimes. During the downtime, if the total working page set size is greater than the maximum limit, then the system may determine the average value of the knob obtained during all last recommendations before the last scheduled downtime. If the new averaged value is lesser than the current value accompanied by at least one entropy hit, then this knob value is reduced. The entropy hit indicates that the other tunable knobs have already raised many throttles and now it is mandatory to create more room for tunable knobs by reducing the buffer knob value.

Now when the memory for buffer value is reduced with respect to the current knob value, it provides more room for other memory related tunable knobs. So if the cost on throughput for tunable knobs is more, tuning services rotates around nearly same values for buffer knob, else in the next iteration it increases the value of buffer knob (average value of buffer knob obtained until the last scheduled down-time is encountered).

When the buffer knob reaches the max limit, it becomes difficult to tune the rest of the tunable memory knobs. It is observed that when buffer knob reaches the limit, no more room is left if a recommendation comes to increase the tunable memory knob. Another approach may be to decrease one or more tunable knob to make room for one tunable knob. However, decreasing a tunable knob can also result a throttle. In this case, if still increasing or decreasing tunable knobs within the total left limit is not reducing the throttles, then as per algorithm defined for performance throttling entropy will soon hit and stop the throttles. However, an entropy hit is an indication that a VM or container configuration of the underlying database service instance needs to be scaled up.

Figure 7A:
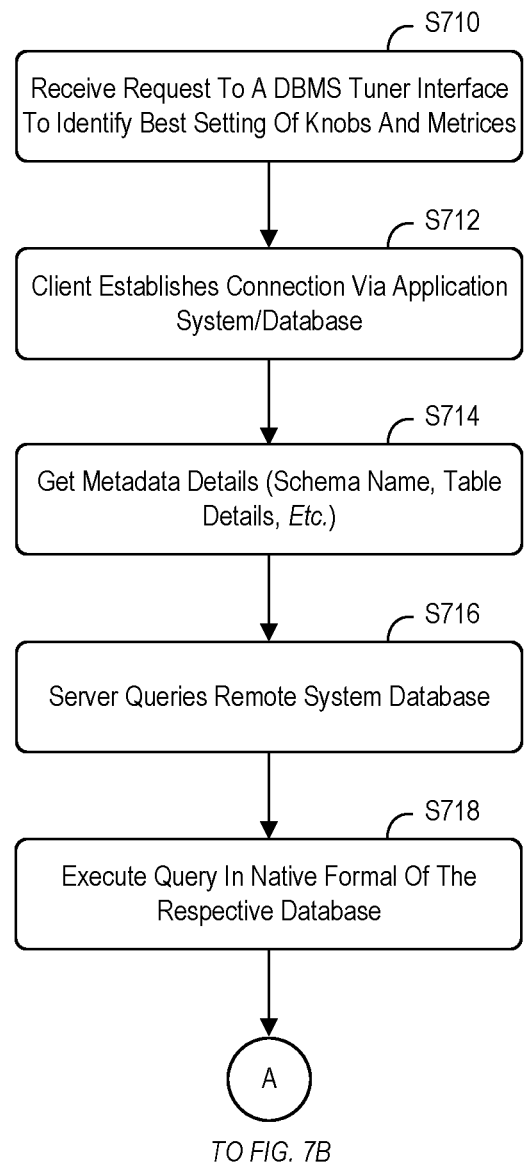
FIGS. 7A through 7C illustrate a more detailed method according to some embodiments.
Figure 7B:
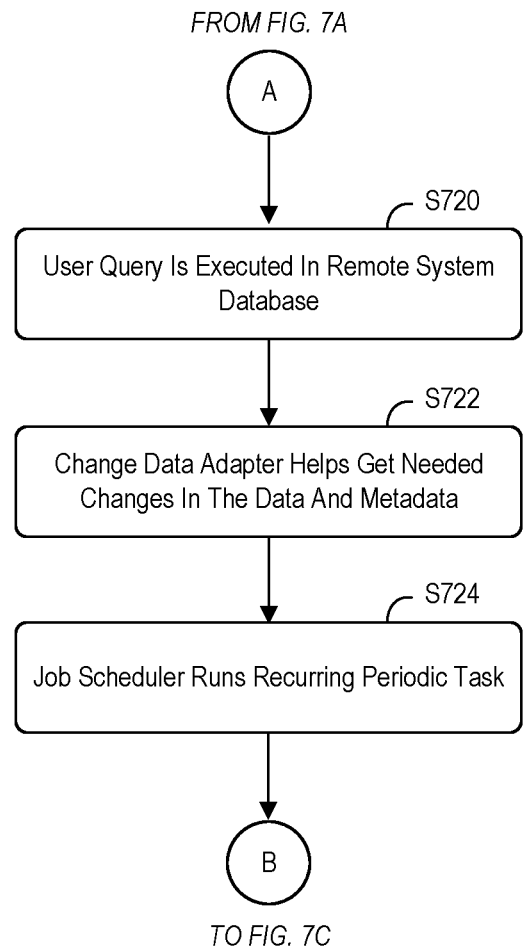
Figure 7C:
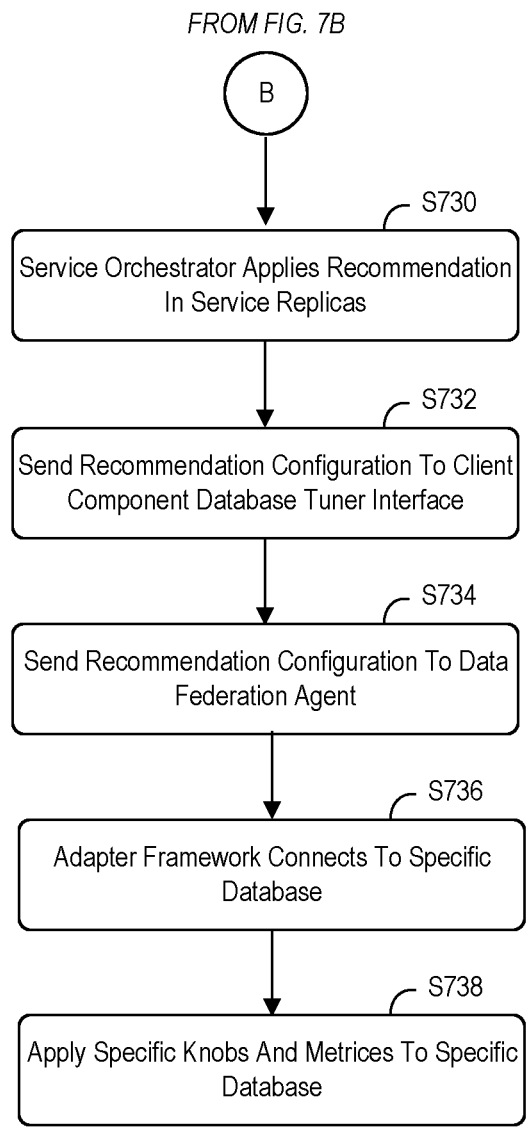

FIGS. 7A through 7C illustrate a more detailed method according to some embodiments. Referring now to FIG. 7A, at S710 the system may receive a request to a DBMS tuner interface to identify the best optimized settings of different knobs and metrics needed for DBMS administration in connection with a specific context. At S712, the client may establish a connection via an application system/database and establish a connection with the remote system/databases based on the user request using an adapter framework. Note that the user certificate may be created dynamically with a limited time validity to access the remote system based on the user request. At S714, the server system gets the metadata details (e.g., schema name, tables details, etc.) from the remote system database and stores it locally in the metadata layer. At S716, the server queries the remote system database tables and the query is pushed down to the remote system database via to federation framework to do the workload classification (based on contextual and situational awareness) to identify the knobs and metrics (and for doing workload forecasting). At S718, the query is executed in the native format of the respective database using the data access services in the server system Referring now to FIG. 7B, at S720 the user query may be executed in the remote system database, and the system may retrieve the metadata from the target database using the adapter framework. At S722, the appropriate adapter helps to get the needed changes in the data/metadata from the remote data sources (e.g., database reader for "initial load" and log reader for "change data capture"). Note that if the target system is not guaranteed to be available (that is, in the event that a target is temporarily unavailable) there may be an option to persist the data in the data store to let the other target system continue to capture and send data (and truncate the target system resources) without waiting for the target to return to service. If there are multiple targets, the same persistence may let the system store data until the offline target returns to service (without delaying normal processing or for remaining other targets). That is, such an approach may persist data to protect from short-term target system outages. At S724, the job scheduler runs (by a dedicated data processor) the recurring periodic tasks to do the workload classification and identify different knobs needed for database performance administration (and to do the workload forecasting). Note that this component may use different machine learning, deep learning, and neural network algorithms for classification, knob identification, etc. Moreover, a rule engine may create and execute different rules for automated administration. The recommendation engine may create a recommended configuration for the given database under specific environment constraints, and the tuning manager may visualize the recommended configuration via a web interface. These tasks may be managed in the config director instance (and multiple config director instances may run in parallel as managed by the service orchestrator).

Referring now to FIG. 7C, at S730 the service orchestrator applies the recommendation in the service replicas for any anomaly detection. Note there may be multiple service replicas managed by the service orchestrator and that multiple database service instances may be managed by the service orchestrator (which also has the throttling detection engine). At S732, the recommendation configuration is given to the client component database tuner interface and the knobs and metrics are given to the controller for the data collector process (as well as a data formatter process to get appropriately formatted data. At S734, the recommendation configuration is passed to the data federation agent so that it can be passed to the specific database. Note that the tuning recommendation may be centrally collected from different databases and stored in the data repository so that the recommendations are improved based on the past learnings from different database vendors, versions, deployment modes, etc. Moreover, the data repository may be governed by a central tuning agent which acts as a central tuning advisor for all the different databases. At S736, the adapter framework in the data federation agent connects to the specific database using the respective adapter of that database. At S738, the specific knobs and metrics may then be applied to the specific database to improve performance.

Figure 8:
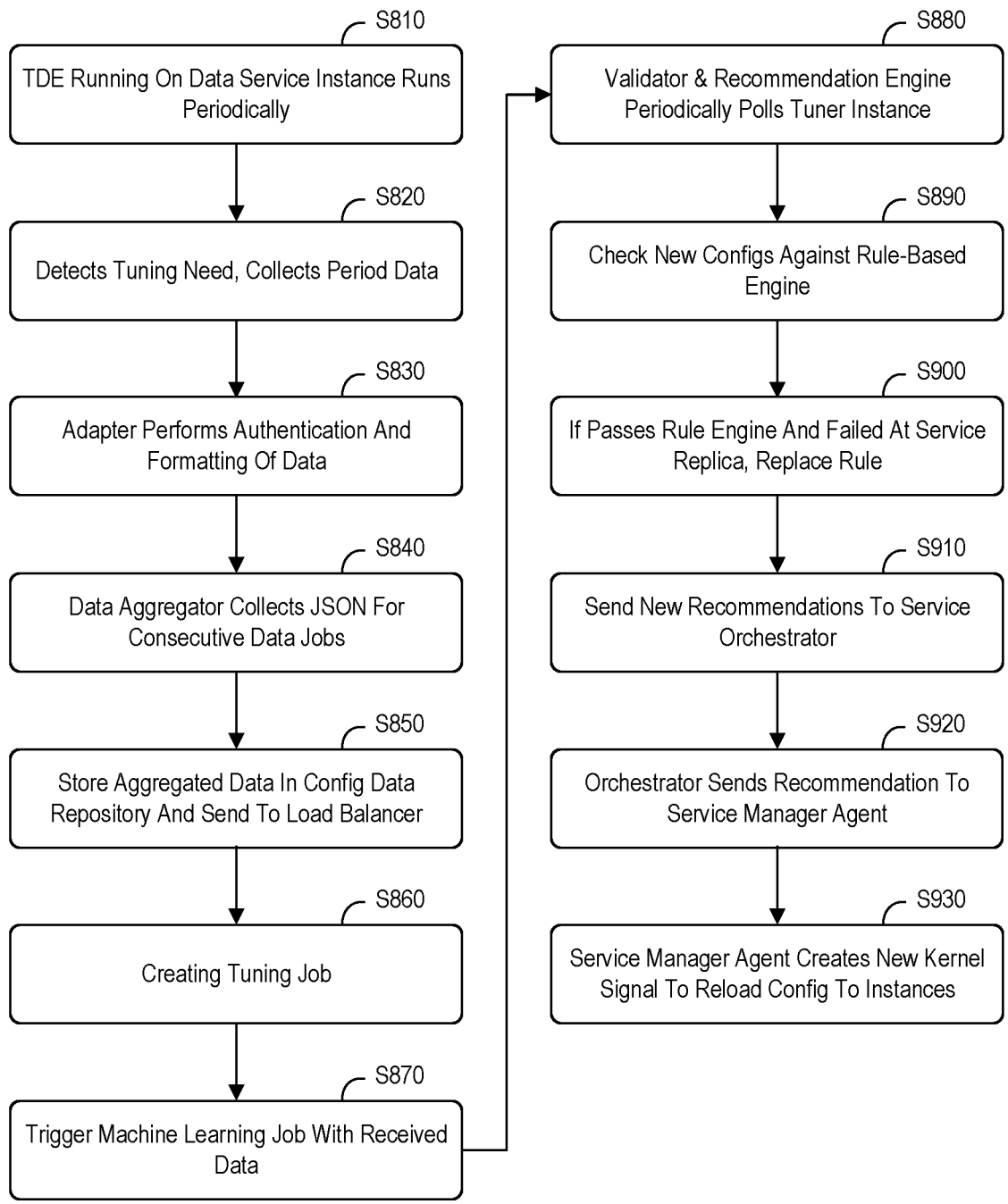
FIG. 8 is an overall algorithm associated with configuration recommendations in accordance with some embodiments.

FIG. 8 is an overall algorithm associated with configuration recommendations in accordance with some embodiments. The method may represent an abstracted flow representing recommendation request generation to applying new configs (for knobs that don't require a restart of the database system process). At S810, a throttling detection engine running on data service instances executes periodically (to collect features/metrics and trigger a rule-based engine) to determine when the underlying database service needs tuning (e.g., the period might comprise 1 minute). At S820, when the throttling detection engine detects a requirement of tuning, it collects the particular period data and sends to the mapped config director instance: Data Federation Agent ("DFA")-Adapter. At S830, the adapter performs the authentication and formatting of data, converts it to JSON, and sends it to data-aggregator. At S840, the data-aggregator aggregates the JSON for the consecutive data jobs collected based on aggregation logic. Later on, at S850 the data aggregator stores the aggregated data in config data repository and sends it to load balancer to provide to the tuner machine learning engine. At S860, the load balancer creates a tuning job, stores the job_id and sends the job to one of the tuner instances based on load-balancing algorithm. At S870, the tuner triggers a machine learning job with the received data—stores this into its local repository (which runs on a separate virtual machine) and recommends a new configuration for the received knob tuning job. At S880, the validator and recommendation engine continues to periodically poll the tuner instance using the job_id to get the recommendation. Once the tuner computes a new recommendation, the validator and recommendation engine receives the recommendations and starts validation. At S890, the new configs are initially checked against a rule-based engine for testing and then finally tested against the bare service-replicas. At S900, if the new recommendation passed the rule engine and failed at the service-replica test, the rule is replaced, and new rule is added. At S910, after validation, the newly obtained recommendations are sent to service-orchestrator which stores the new configs at service-config data repo. At S920, now the service orchestrator sends the recommendation to a service manager agent (running on multiple instances of the same persistence subscribed service to maintain the consistency). At S930, service manager agent may now create a new kernel signal to reload the new configs to instances.

Figure 9:
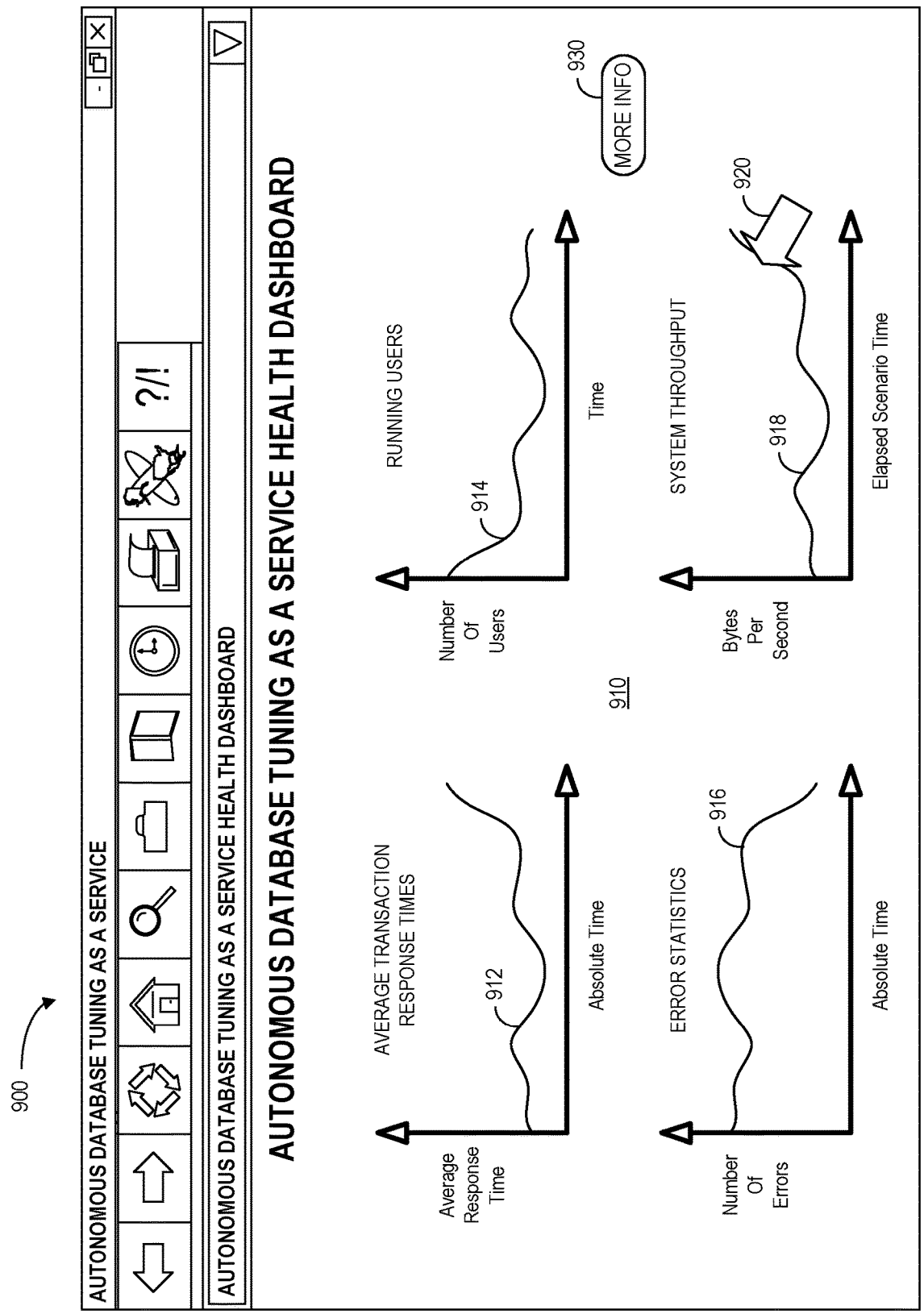
FIG. 9 is a human machine interface display according to some embodiments.

FIG. 9 is a human machine interface display 900 in accordance with some embodiments. The display 900 includes a graphical representation 910 or dashboard that might be used to monitor the health of a database tuning as a service framework (e.g., associated with a cloud provider). In particular, the display 900 contains graphs showing average transaction response times 912, a number of running users 914, error statistics 916, and system throughput 918. Selection of an element (e.g., via a touch-screen or computer pointer 920) might result in display of a pop-up window that contains supporting data. The display 900 may also include a user-selectable "More Info" icon 930 to request addtioinal data (e.g., to investigate system performance).

Figure 10:
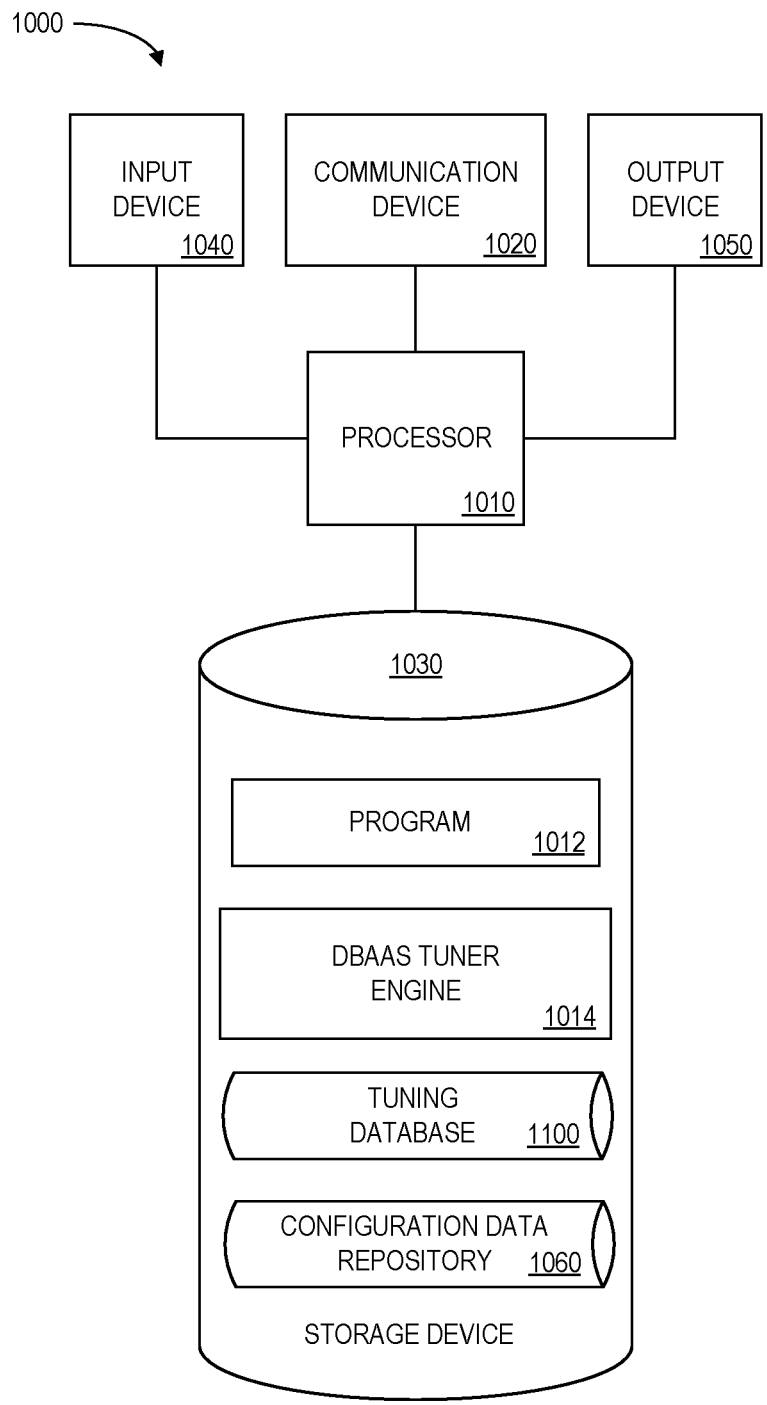
FIG. 10 is an apparatus or platform according to some embodiments.

Note that the embodiments described herein may be implemented using any number of different hardware configurations. For example, FIG. 10 is a block diagram of an apparatus or platform 1000 that may be, for example, associated with the system 100 of FIG. 1 (and/or any other system described herein). The platform 1000 comprises a processor 1010, such as one or more commercially available Central Processing Units ("CPUs") in the form of one-chip microprocessors, coupled to a communication device 1060 configured to communicate via a communication network (not shown in FIG. 10). The communication device 1060 may be used to communicate, for example, with one or more remote user platforms, resource allocators, etc. The platform 1000 further includes an input device 1040 (e.g., a computer mouse and/or keyboard to input database or tuning information) and/an output device 1050 (e.g., a computer monitor to render a display, transmit recommendations, and/or create database service reports). According to some embodiments, a mobile device and/or PC may be used to exchange information with the platform 1000.

The processor 1010 also communicates with a storage device 1030. The storage device 1030 can be implemented as a single database or the different components of the storage device 1030 can be distributed using multiple databases (that is, different deployment information storage options are possible). The storage device 1030 may comprise any appropriate information storage device, including combinations of magnetic storage devices (e.g., a hard disk drive), optical storage devices, mobile telephones, and/or semiconductor memory devices. The storage device 1030 stores a program 1012 and/or database tuning as a service tuner engine 1014 for controlling the processor 1010. The processor 1010 performs instructions of the programs 1012, 1014, and thereby operates in accordance with any of the embodiments described herein. For example, the processor 1010 may facilitate a database tuning as a service offered by a cloud platform as a service provider. The processor 1010 may periodically determine if an automated database tuning process should be performed. When it is determined that the automated database tuning process should be performed, the processor 1010 may transmit database performance metrics. The processor 1010 may access aggregated database performance metrics of the database service instance and determine a set of tunable parameters associated with the database service instance. The processor 1010 may then execute the automated database tuning process to recommend, using an intelligent algorithm, a new set of configurations for the set of tunable parameters to be applied to the database service instance.

The programs 1012, 1014 may be stored in a compressed, uncompiled and/or encrypted format. The programs 1012, 1014 may furthermore include other program elements, such as an operating system, clipboard application, a database management system, and/or device drivers used by the processor 1010 to interface with peripheral devices.

As used herein, information may be "received" by or "transmitted" to, for example: (i) the platform 1000 from another device; or (ii) a software application or module within the platform 1000 from another software application, module, or any other source.

In some embodiments (such as the one shown in FIG. 10), the storage device 1030 further stores a configuration data repository and a tuning database 1100. An example of a database that may be used in connection with the platform 1000 will now be described in detail with respect to FIG. 11. Note that the database described herein is only one example, and additional and/or different information may be stored therein. Moreover, various databases might be split or combined in accordance with any of the embodiments described herein.

Figure 11:
FIG. 11 illustrates a tuning database in accordance with some embodiments.

Referring to FIG. 11, a table is shown that represents the tuning database 1100 that may be stored at the platform 1100 according to some embodiments. The table may include, for example, entries identifying tuning operations that have been performed (e.g., in a database tuning as a service environment). The table may also define fields 1102, 1104, 1106, 1108, 1110 for each of the entries. The fields 1102, 1104, 1106, 1108, 1110 may, according to some embodiments, specify: a tune request identifier 1102, database performance metrics 1104, a database identifier 1106, a recommended configuration 1108, and a validation status 1110. The tuning database 1100 may be created and updated, for example, when a throttling detection engine identifies a problem, etc.

The tune request identifier 1102 might be a unique alpha-numeric label or link that is associated with a particular request from the throttling detection engine to create a new knob config for a database tuning as a service. The data performance metrics 1104 might reflect how the system was performing when the problem was identified. The database identifier 1106 might indicate which database needs tuning (e.g., so that an appropriate adapter may be selected). The recommended configuration 1108 may represent a new set of knob values that will help performance of the database tuning as a service. The validation status 1110 might indicate whether or not those new knob values have been approved (e.g., after being tested in a replica environment).

Thus, embodiments may provide automated database tuning as a service to manage platform data services in a fast, automatic, and accurate manner. Embodiments may improve user friendliness by allowing for a database tuning as a service to be automatically tuned (without needing a DBA) and reduce response time for interactions and/or to complete operational tasks (e.g., to retrieve information from the database). According to some embodiments, an increase in growth and/or scale may be provided (e.g., because the throttling detection engine reduces tuning requests) along with a reduced time to impact revenue (that is, databases may be deployed more quickly. Moreover, an increase of business growth, productivity, efficiency, and quality may be provided by the various embodiments described herein.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 12:
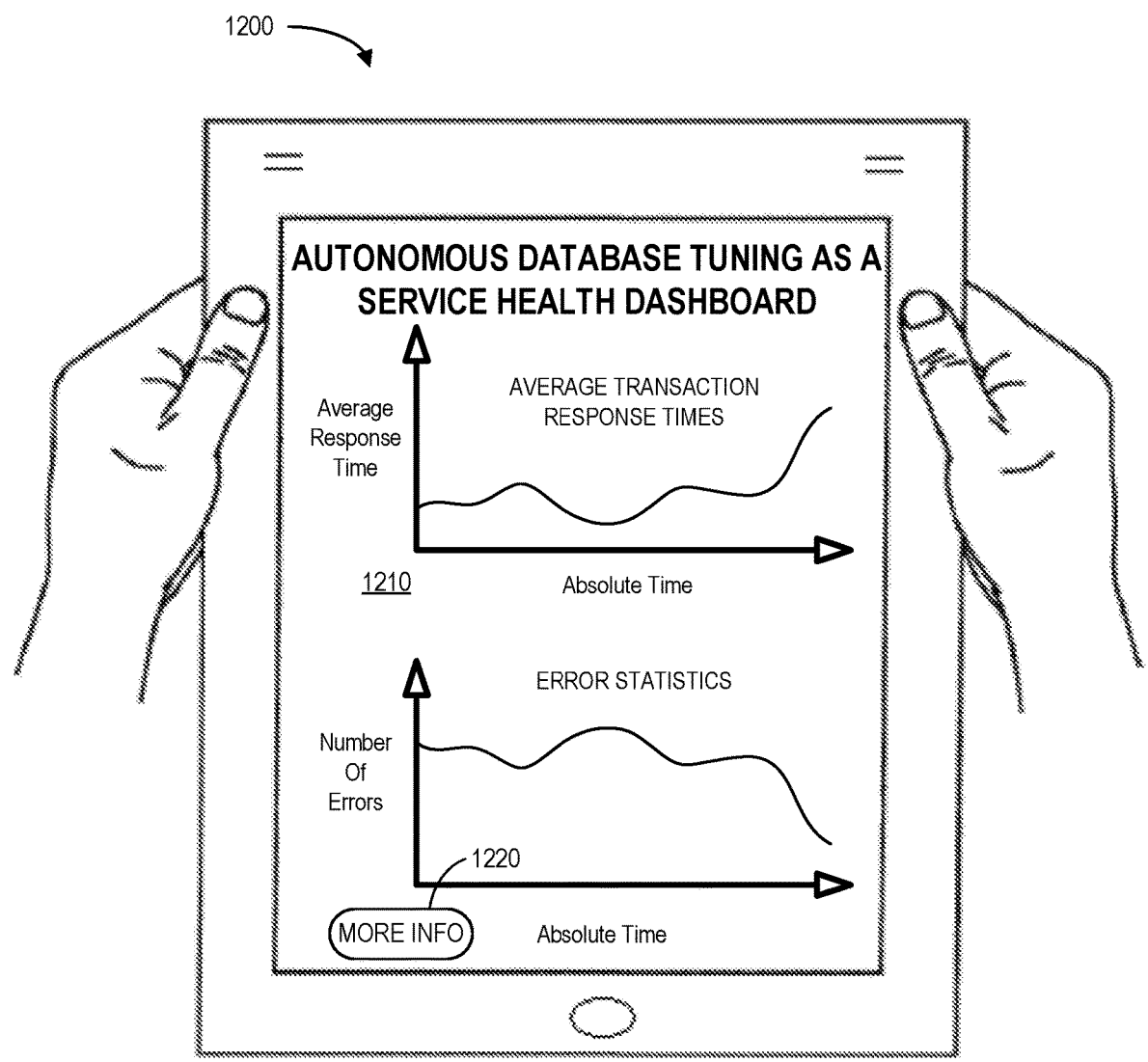
FIG. 12 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of item and contracts, any of the embodiments described herein could be applied to other types of items and contracts. Moreover, the displays shown herein are provided only as examples, and any other type of user interface could be implemented. For example, FIG. 12 shows a tablet computer 1200 rendering a display 1210 or dashboard that may be used to monitor the health of database tuning as a service framework components or to request additional information (e.g., via "More Info" icon 1220).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to facilitate a database tuning as a service offered by a cloud platform as a service provider, comprising:
a storage device storing processor-executable instructions to implement a throttling detection engine associated with a database service instance and to implement a database tuner as a service, coupled to the throttling detection engine; and
a processor to execute the processor-executable instructions, the processor to execute the processor-executable instructions to cause the throttling detection engine to:
periodically determine, based on an actual current performance throttling of the database service instance, whether an automated database tuning process should be performed, and
in response to the determination that the automated database tuning process should be performed, transmit database performance metrics; and
the processor, in response to the determination that the automated database tuning process should be performed, to execute the processor-executable instructions to cause the database tuner as a service to:
access aggregated database performance metrics of the database service instance,
determine a set of tunable parameters associated with the database service instance,
execute the automated database tuning process to recommend, using an intelligent algorithm, a new set of configurations for the set of tunable parameters to be applied to the database service instance; and
validate the recommended new set of configurations for the set of tunable parameters, the validation being based on (1) dynamic rule-based filtering validated against a pre-defined set of rules defined for the specific database service instance and (2) bare service-replica filtering of the database service instance excluding data of the database service instance.

2. The system of claim 1, wherein the automated database tuning process uses a generic regression process on previously observed database workloads to make said recommendation.

3. The system of claim 1, wherein the aggregated database performance metrics are associated with a dynamically calculated observation time.

4. The system of claim 1, wherein the database performance metrics include at least one of: (i) a response time, (ii) a number of queued requests, and (iii) a throughput.

5. The system of claim 1, wherein the set of tunable parameters includes at least one of: (i) memory knobs, (ii) background writer knobs, (iii) asynchronous and planner estimate knobs, (iv) locking knobs, and (v) any other relevant knob.

6. The system of claim 1, wherein the validation of the new set of configurations for the set of tunable parameters is evaluated by a recommendation and validation engine.

7. The system of claim 1, wherein, in the instance the validation by the dynamic rule-based filtering is inconclusive, the validation based on the bare service-replica filtering is performed.

8. The system of claim 1, wherein the database tuner as a service is spawned by the cloud provider as a Virtual Machine ("VM") ware, multi-tenant container.

9. The system of claim 1, further comprising:
a data federation agent, coupled to database service instance, to:
aggregate the database performance metrics of the database service instance.

10. The system of claim 1, wherein the database service instance is associated with at least one of: (i) a relational database, (ii) a Structured Query Language ("SQL") database, (iii) a Not only SQL ("NoSQL") database, (iv) an in-memory database, (v) a messaging service, and (vi) an enterprise service bus.

11. A computer-implemented method to facilitate a database tuning as a service offered by a cloud platform as a service provider, comprising:
periodically determining, by a throttling detection engine associated with a database service instance based on an actual current performance throttling of the database service instance, whether an automated database tuning process should be performed;
transmitting, in response to the determination that the automated database tuning process should be performed, database performance metrics;
accessing, by a database tuner as a service coupled to the throttling detection engine in response to the determination that the automated database tuning process should be performed, aggregated database performance metrics of the database service instance;
determining a set of tunable parameters associated with the database service instance;
executing the automated database tuning process to recommend, using an intelligent algorithm, a new set of configurations for the set of tunable parameters to be applied to the database service instance; and
validating the recommended new set of configurations for the set of tunable parameters, the validation being based on (1) dynamic rule-based filtering validated against a pre-defined set of rules defined for the specific database service instance and (2) bare service-replica filtering of the database service instance excluding data of the database service instance.

12. The method of claim 11, wherein the automated database tuning process uses a generic regression process on previously observed database workloads to make said recommendation.

13. The method of claim 11, wherein the aggregated database performance metrics are associated with a dynamically calculated observation time.

14. The method of claim 11, wherein the database performance metrics include at least one of: (i) a response time, (ii) a number of queued requests, and (iii) a throughput.

15. The method of claim 11, wherein the set of tunable parameters includes at least one of: (i) memory knobs, (ii)

background writer knobs, (iii) asynchronous and planner estimate knobs, (iv) locking knobs, and (v) an other relevant knobs.

16. The method of claim 11, wherein the validating of the new set of configurations for the set of tunable parameters is evaluated by a recommendation and validation engine.

17. The method of claim 11, wherein, in the instance the validating by the dynamic rule-based filtering is inconclusive, the validation based on the bare service-replica filtering is performed.

18. The method of claim 11, wherein the database tuner as a service is spawned by the cloud provider as a Virtual Machine ("VM") ware, multi-tenant container.

19. A non-transitory, computer readable medium having executable instructions stored therein, the medium comprising:
   instructions to periodically determine, by a throttling detection engine associated with a database service instance based on an actual current performance throttling of the database service instance, whether an automated database tuning process should be performed;
   instructions to, in response to the determination that the automated database tuning process should be performed, transmit database performance metrics;
   instructions to access, by a database tuner as a service coupled to the throttling detection engine in response to the determination that the automated database tuning process should be performed, aggregated database performance metrics of the database service instance;
   instructions to determine a set of tunable parameters associated with the database service instance; and
   instructions to execute the automated database tuning process to recommend, using an intelligent algorithm, a new set of configurations for the set of tunable parameters to be applied to the database service instance; and
   instructions to validate the recommended new set of configurations for the set of tunable parameters, the validation being based on (1) dynamic rule-based filtering validated against a pre-defined set of rules defined for the specific database service instance and (2) bare service-replica filtering of the database service instance excluding data of the database service instance.

20. The medium of claim 19, wherein the database service instance is associated with at least one of: (i) a relational database, (ii) a Structured Query Language ("SQL") database, (iii) a Not only SQL ("NoSQL") database, (iv) an in-memory database, (v) a messaging service, and (vi) an enterprise service bus.

* * * * *